A. HARBISON.
SWARM-BOX.

No. 173,002. Patented Feb. 1, 1876.

WITNESSES:
E. Wolff
Alex F. Roberts

INVENTOR:
A. Harbison
BY Munn & Co.
ATTORNEYS.

UNITED STATES PATENT OFFICE.

ANDREW HARBISON, OF NEWCASTLE, PENNSYLVANIA.

IMPROVEMENT IN SWARM-BOXES.

Specification forming part of Letters Patent No. 173,002, dated February 1, 1876; application filed October 29, 1875.

*To all whom it may concern:*

Be it known that I, ANDREW HARBISON, of Newcastle, in the county of Lawrence and State of Pennsylvania, have invented a new and Improved Swarm Box or Catcher, of which the following is a specification:

The object of this invention is to catch swarms of bees as they issue from the parent hive, and keep them confined until at leisure to introduce them into new habitations, thereby saving much time of the attendant, risk of several swarms mingling together, and the consequent destruction of their queens, as well as the danger of leaving for the woods.

Figure 1:
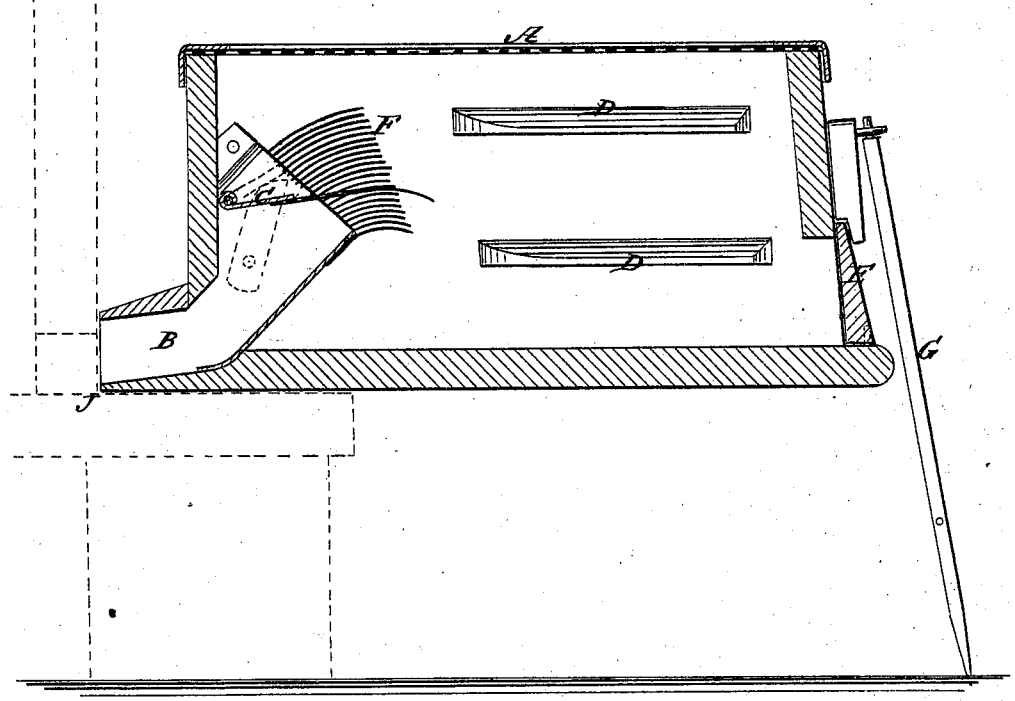
Figure 2:
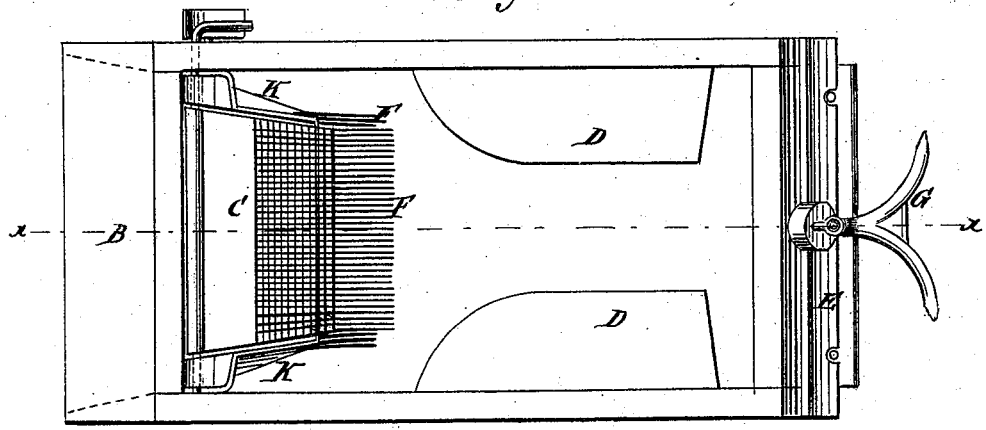

Figure 1 is a sectional elevation, and Fig. 2 is a horizontal section.

Similar letters of reference indicate corresponding parts.

The swarm box or catcher is constructed of thin light lumber, except the top A, which should be of No. 10 wire-cloth, or its equivalent. The size and shape may be varied. I recommend them to be made thirty inches long, thirteen inches wide, and fourteen inches deep.

The place of ingress is arranged in one end, in such a manner as to embrace the passage-way of the hive from which the swarm is to be caught, being placed in position by the attendant immediately on discovering the commencement of swarming.

The swarm is caused to pass through a tube or entrance-way, B, extending inward and upward, at an angle of about forty-five degrees, to a distance of eight inches, the bottom of the tube being of wood, attached to the bottom of the box the entire width, but tapering to a width of nine inches, or so that a space, K, of two inches is left at each side at its terminus. The sides of the tube are made of wire-cloth or suitable material, rising to the height of four inches, the cloth forming three sides of the tube or passage-way.

The upper side is an adjustable door or lid, C, working on pivots, so as to open or close, or set to give any desired space for the swarm to emerge into the box. The edges around this tube are armed with wire pickets F, the upper course on the adjustable door or lid being longer than the lower or stationary one. Both courses are curved downward. The object is to prevent the bees from again returning to the parent hive, as they cannot successfully pass over the wire pickets.

The wire top A may be either nailed on or made movable. The advantage of having it movable is to make it practical to hive a swarm temporarily into the box or catcher from a tree, or any other place where a swarm may alight, in cases where the swarm is out on the wing before being discovered. It can then be carried to the apiary and relieved in the usual way, which will be found much easier than to carry a heavy hive.

On the sides, in the interior, there are one or more ledges, D, or shelves, on each side, for the swarm to cluster on, as a support is necessary when a swarm is to remain in the box for some time before hiving.

It is found that, by leaving the swarm in the box or catcher for one-half hour or more, the presence of a queen can be determined with certainty. If all right, the bees cluster quietly on the ledges; if not, the bees will be in confusion.

At the outer end of the box there is a slip-door, E, held in place by a button. When the swarm is to be removed this door is to be taken off and the bees shaken out.

There is a staple attached to the button, into which the support G is held in place when in use, to support the outer end of the box or catcher, the other end being on the hive J.

The object of the spaces between the tube B and walls of trap or catcher is to prevent the bees from returning to the parent hive from a lateral direction.

What I claim as new is—

A swarm-box provided with wire-gauze top A, upwardly-inclined tube B, having hinged door C and pickets F, and the shelves D, all substantially as shown and described.

ANDREW HARBISON.

Witnesses:
GEO. W. VEACH,
JOHN BLEVINS.